United States Patent
Brooke, Jr. et al.

(10) Patent No.: US 7,031,804 B2
(45) Date of Patent: Apr. 18, 2006

(54) VENDING MACHINE WITH TRANSPONDER INTERROGATOR

(76) Inventors: Russell J. Brooke, Jr., 2758 Margret Mitchell Dr., Atlanta, GA (US) 30327; Jeremy Schwartz, Gogolgasse 12, A-1130 Vienna (AT)

( * ) Notice: Subject to any disclaimer, the term of this patent is extended or adjusted under 35 U.S.C. 154(b) by 240 days.

(21) Appl. No.: 10/200,710

(22) Filed: Jul. 22, 2002

(65) Prior Publication Data

US 2002/0183893 A1    Dec. 5, 2002

Related U.S. Application Data

(63) Continuation of application No. 09/261,268, filed on Mar. 3, 1999, now Pat. No. 6,424,884.

(51) Int. Cl.
*G06F 17/00*    (2006.01)
(52) U.S. Cl. .................................... 700/232; 235/381
(58) Field of Classification Search ............... 700/232, 700/236, 237, 238, 240, 241, 242, 244, 245; 235/375, 380, 381–383, 385, 379; 186/36, 186/53, 55, 56; 221/9–14
See application file for complete search history.

(56) References Cited

U.S. PATENT DOCUMENTS

| | | |
|---|---|---|
| 3,914,762 A | 10/1975 | Klensch |
| 4,072,930 A | 2/1978 | Lucero et al. |
| 4,573,954 A | 3/1986 | Berger et al. |
| 5,069,453 A | 12/1991 | Koza et al. |
| 5,072,380 A | 12/1991 | Randelman et al. |
| 5,119,087 A | 6/1992 | Lucas |
| 5,264,822 A | 11/1993 | Vogelman et al. |
| 5,351,187 A | 9/1994 | Hassett |
| 5,382,778 A | 1/1995 | Takahira et al. |
| 5,450,938 A | 9/1995 | Rademacher |
| 5,532,689 A | 7/1996 | Bueno |
| 5,569,082 A | 10/1996 | Kaye |
| 5,586,686 A | 12/1996 | Bustos et al. ................. 186/55 |
| 5,588,649 A | 12/1996 | Blumberg et al. |
| 5,602,919 A | 2/1997 | Hurta et al. |
| 5,648,767 A | 7/1997 | O'Connor et al. |
| 5,661,286 A | 8/1997 | Fujioka |
| 5,709,603 A | 1/1998 | Kaye |
| 5,798,714 A | 8/1998 | Nyfelt |
| 5,862,222 A | 1/1999 | Gunnarsson |
| 5,980,090 A | 11/1999 | Royal et al. ................. 700/2.1 |
| 6,089,284 A | 7/2000 | Kaehler et al. ............. 700/232 |
| 6,263,316 B1 * | 7/2001 | Khan et al. ................... 705/13 |
| 6,304,796 B1 * | 10/2001 | Ding .......................... 700/237 |
| 6,360,139 B1 * | 3/2002 | Jacobs ........................ 700/232 |

(Continued)

FOREIGN PATENT DOCUMENTS

EP    0 461 888    12/1991

*Primary Examiner*—Andrew Joseph Rudy
(74) *Attorney, Agent, or Firm*—Sutherland, Asbill and Brennan LLP

(57) ABSTRACT

A vending machine includes a transponder interrogator. A customer carries a transponder embedded within an ornamental or useful item, such as a key chain ornament. When the customer desires to make a purchase from the vending machine, the customer presents the transponder to the transponder interrogator. The transponder is identified and a credit amount associated with that transponder is debited the purchase price. The system enables the vending machine operator to track the purchasing habits of the transponder user, and to provide instant incentives to purchasers using the transponder, based upon the customer's profile or purchasing habits.

4 Claims, 6 Drawing Sheets

U.S. PATENT DOCUMENTS

| | | | |
|---|---|---|---|
| 6,424,884 B1 * | 7/2002 | Brooke et al. | 700/232 |
| 6,446,049 B1 * | 9/2002 | Janning et al. | 705/40 |
| 6,725,202 B1 * | 4/2004 | Hurta et al. | 705/13 |
| 6,882,900 B1 * | 4/2005 | Terranova | 700/237 |

* cited by examiner

VENDING MACHINE WITH TRANSPONDER INTERROGATOR

Related Applications

The present application is a Continuation of Application Ser. No. 09/261,268, now U.S. Pat. No. 6,424,884, filed on Mar. 3, 1999 and issued on Jul. 23, 2002.

BACKGROUND OF THE INVENTION

1. Field of the Invention

The present invention relates to a consumer rewards system and consumer purchasing-history tracking system including a customer carried transponder unit. Also, the present invention relates to a vending machine for dispensing goods or services, which interacts with the transponder unit.

2. Description of the Background Art

Transponder—interrogator systems are known in the existing arts. In U.S. Pat. No. 3,914,762 to Klensch, a transponder interrogator generates electromagnetic energy of a predetermined frequency. This energy is received by a proximate transponder tag and used to pulse modulate a harmonically derived signal in accordance with a predetermined digital identification code. The pulse modulated signal is received by the transponder interrogator and used to uniquely identify the transponder tag.

Further, it is known to employ a transponder—interrogator system in a sales transaction. For example, in U.S. Pat. No. 5,072,380 to Randelman et al., a transponder interrogator is located at a service station. The transponder interrogator includes an antenna embedded near a gas pump which transmits a constant electromagnetic field. A transponder card is provided in a vehicle. When the vehicle approaches the pump, the transponder is energized by the electromagnetic field and responds with an identification code, such as the VIN (vehicle identification number). The transponder interrogator receives the identification code and reports the same to a controller, which logs the customer's transaction and bills the customer's account for the gas purchased.

To date, a transponder—interrogator system has not been employed in conjunction with a consumer rewards system or a consumer purchasing-history tracking system. Moreover, a transponder—interrogator system has not been integrated into a vending machine having certain data handling procedures, so as to reward purchasers with incentives, debit a stored credit value within the transponder, and/or track purchasing habits of individual customers.

SUMMARY OF THE INVENTION

Accordingly, it is an object of the present invention to provide a beverage vending machine having a transponder interrogator for interacting with a customer carried transponder.

Another object of the present invention is to provide a vending machine which identifies a transponder and rewards a customer with free services or goods in response to a predetermined condition.

Yet another object of the present invention is to provide a vending machine which determines a credit amount stored within a transponder and debits a purchase price of a dispensed service or good from the credit amount.

Still another object of the present invention is to provide a consumer purchasing-history monitoring system which identifies a transponder and communicates with a database to track purchasing habits of a customer associated with the transponder and to reward the customer upon a predetermined condition.

These and other objects of the present invention are fulfilled by providing a beverage vending machine comprising: a housing; a dispenser disposed within said housing for dispensing a beverage; a transponder interrogator disposed within said housing for reading a transponder unit; and a controller connected to said transponder interrogator for receiving data from said transponder interrogator, said controller also being connected to said dispenser and being able to cause said dispenser to dispense a beverage in response to the received data.

Also, these and other objects of the present invention are fulfilled by providing a beverage vending machine in combination with a transponder, said combination comprising: a housing; a dispenser disposed within said housing for dispensing a beverage; a transponder, which is physically disconnected from said housing, for transmitting data; a transponder interrogator disposed within said housing for reading said data of said transponder unit; and a controller connected to said transponder interrogator for receiving data from said transponder interrogator, said controller also being connected to said dispenser and being able to cause said dispenser to dispense a beverage in response to the received data.

Moreover, these and other objects are fulfilled by a method of operating a vending machine, said method comprising the steps of: providing a vending machine with a dispenser and a transponder interrogator disposed within a housing; providing a database; providing a transponder, which is physically disconnected from the housing, and which includes a memory for storing identifying data; transmitting an activation signal from the transponder interrogator to the transponder; transmitting the identifying data from the transponder to the transponder interrogator; using the identifying data to access transponder data in the database; and determining whether the accessed transponder data meets a predetermined condition, and communicating a dispense signal from the transponder interrogator to the dispenser if the predetermined condition is met.

Furthermore, these and other objects are fulfilled by a method of operating a vending machine, said method comprising the steps of: providing a vending machine with a dispenser and a transponder interrogator disposed within a housing; providing a transponder, which is physically disconnected from the housing, and which includes a memory for storing credit amount data; transmitting an activation signal from the transponder interrogator to the transponder; transmitting the credit amount data from the transponder to the transponder interrogator; and communicating a dispense signal from the transponder interrogator to the dispenser if the credit amount data, received by the transponder interrogator, exceeds a purchase price.

Furthermore, these and other objects are fulfilled by a consumer data tracking and reward system comprising: a plurality of point of potential sale or interest terminals; a transponder for interacting with said terminals; a communication medium connecting each of the terminals to an external database; and a processor, associated with said external database, monitoring data sent by said terminals representing the interaction of said transponder with said terminals, and permitting a reward to be issued upon a predetermined condition.

Furthermore, these and other objects are fulfilled by a method of tracking consumer data comprising the steps of:

providing a plurality of point of potential sale or interest terminals, a transponder for interacting with any of said terminals, and an external database; interacting the transponder with a one or more of the terminals; sending identifying information concerning an interacted transponder to the external database; tracking consumer data in the external database relating a person associated with the transponder; and rewarding the person, if the consumer data satisfies a predetermined condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a block diagram of circuitry used in a transponder interrogator;

DETAILED DESCRIPTION OF THE PREFERRED EMBODIMENTS

Figure 1:
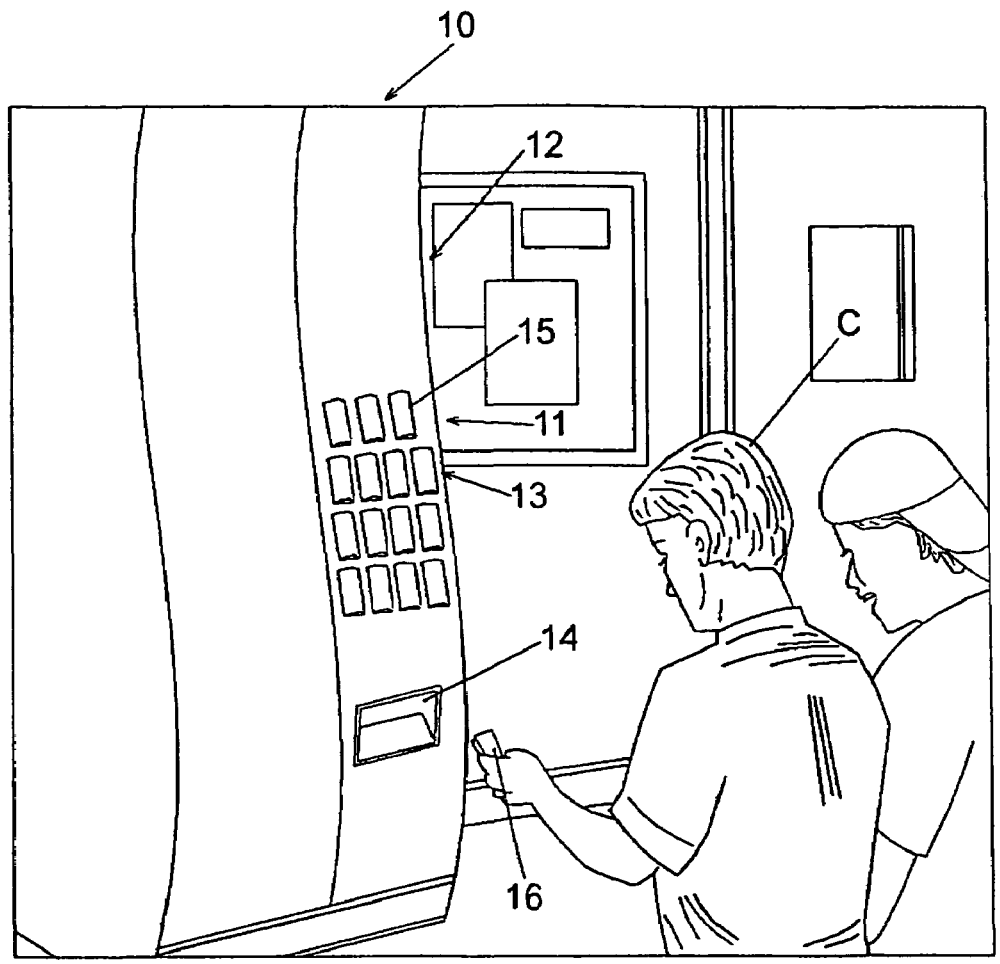
FIG. 1 is a perspective view of a customer presenting a transponder to a beverage vending machine, in accordance with the present invention.

Referring in detail to the drawings and with particular reference to FIG. 1, a beverage vending machine 10, in accordance with the present invention, includes a coin and bill accepting unit 11 located on a front panel 12 thereof. The vending machine also includes conventional beverage selector buttons 13 and a dispensing chute 14 for retrieving a purchased beverage container. Located within or behind the front panel 12 is a transponder interrogator 15. As will be more fully described hereinafter, the transponder interrogator 15 interacts with a transponder 16, carried by a customer C of the vending machine 10.

The vending machine 10 has conventional payment components, such as the coin and bill-accepting unit 11, and/or a smart card reader, so that the vending machine 10 may be operated by conventional payment methods. It should be appreciated that a modified vending machine having no coin or bill-accepting unit 11 or smart card reader could be provided. Such a modified vending machine would be dedicated to transactions initiated by the transponder 16 and would not operate with coins, bills, or smart cards. Also, the present invention could be employed in conjunction with a vending machine for dispensing beverages into cups, or in conjunction with vending machines for dispensing other goods or services, such as candies, cigarettes, fare cards, stamps, sandwiches, gaming credits, video/pinball play credits, etc.

Figure 2:
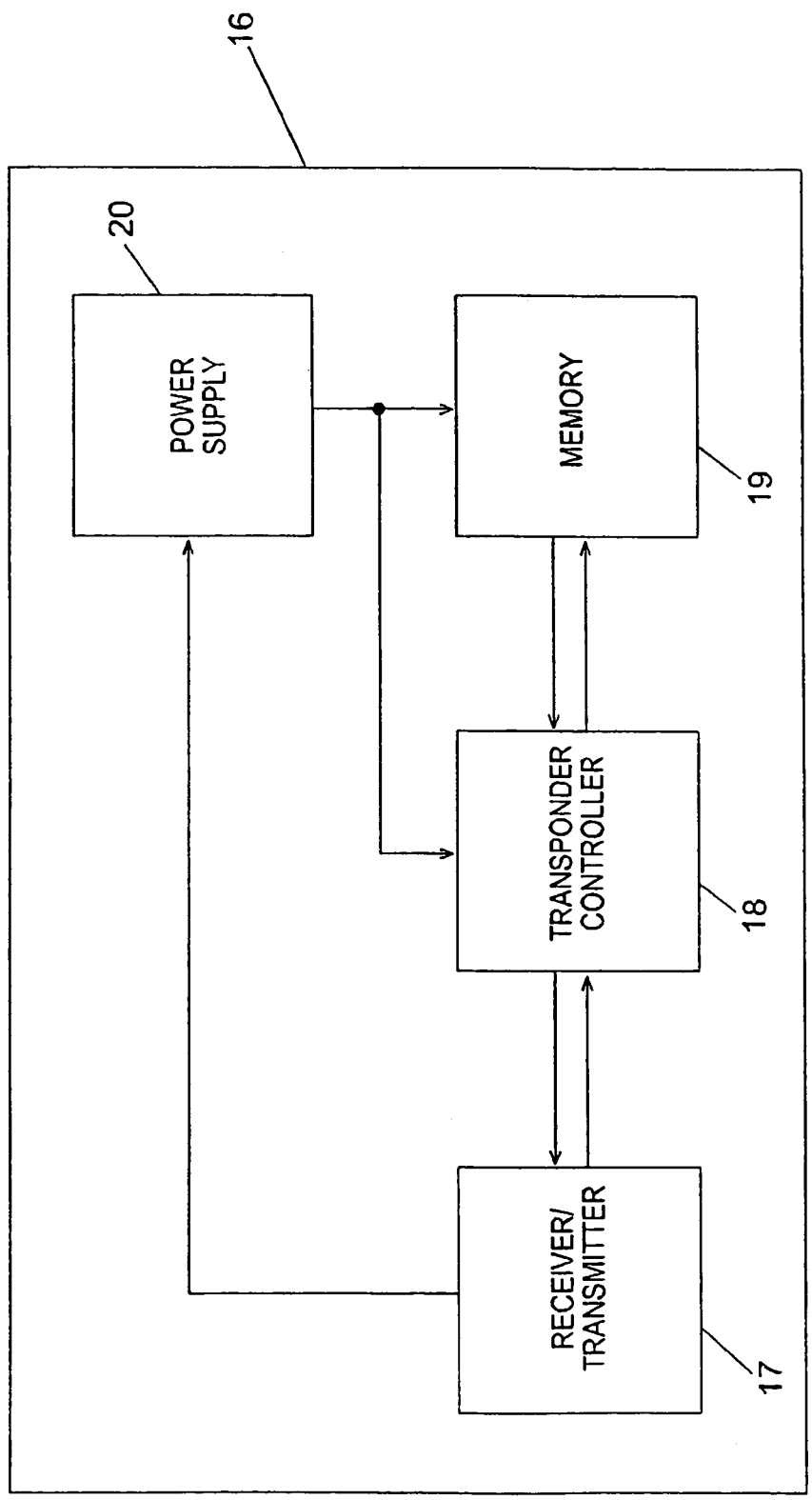
FIG. 2 is a block diagram of circuitry used in the transponder.
Figure 1:
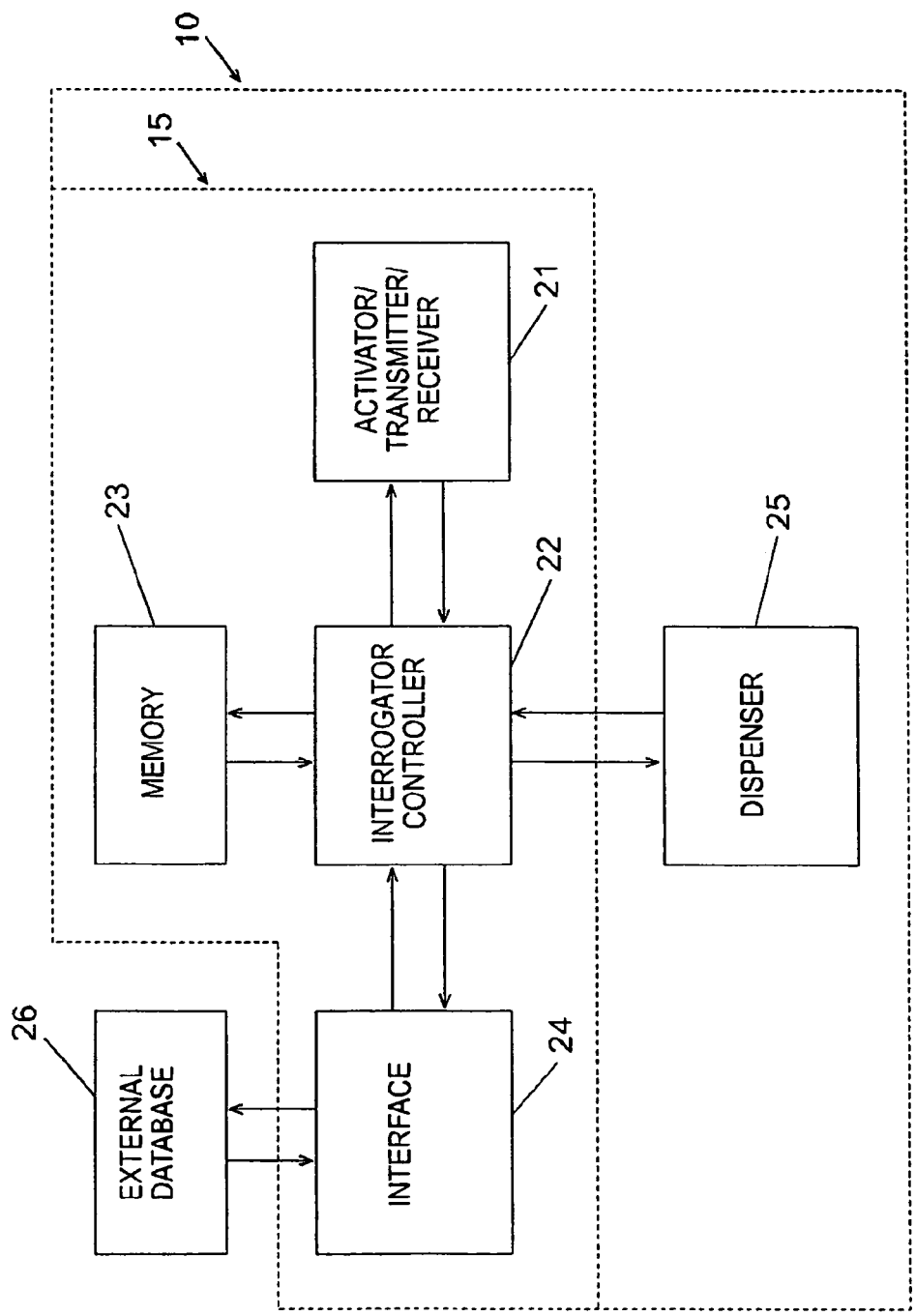

Referring to FIG. 2, the transponder 16 includes a receiver/transmitter unit 17, a transponder controller unit 18, a memory unit 19, and a power supply unit 20. The memory unit 19 includes a program of operation for the transponder controller unit 18. The units 17, 18, 19 and 20 of the transponder 16 are operational units. In constructing the actual circuitry of the transponder 16, one or more operational units may be performed by the same circuitry component.

Referring to FIG. 3, the transponder interrogator 15 includes an activator/transmitter/receiver unit 21, an interrogator controller unit 22, a memory unit 23, and an interface unit 24. The memory unit 23 includes a program of operation for the interrogator controller unit 22. The interrogator controller unit 22 of the transponder interrogator 15 communicates with a dispenser 25 provided within the vending machine 10. Also, the interface unit 24 communicates with an external database 26 remote from the vending machine 10. Again, the units 21, 22, 23 and 24 of the transponder interrogator 15 are operational units, the operations of which may be performed by common circuitry.

Figure 4:
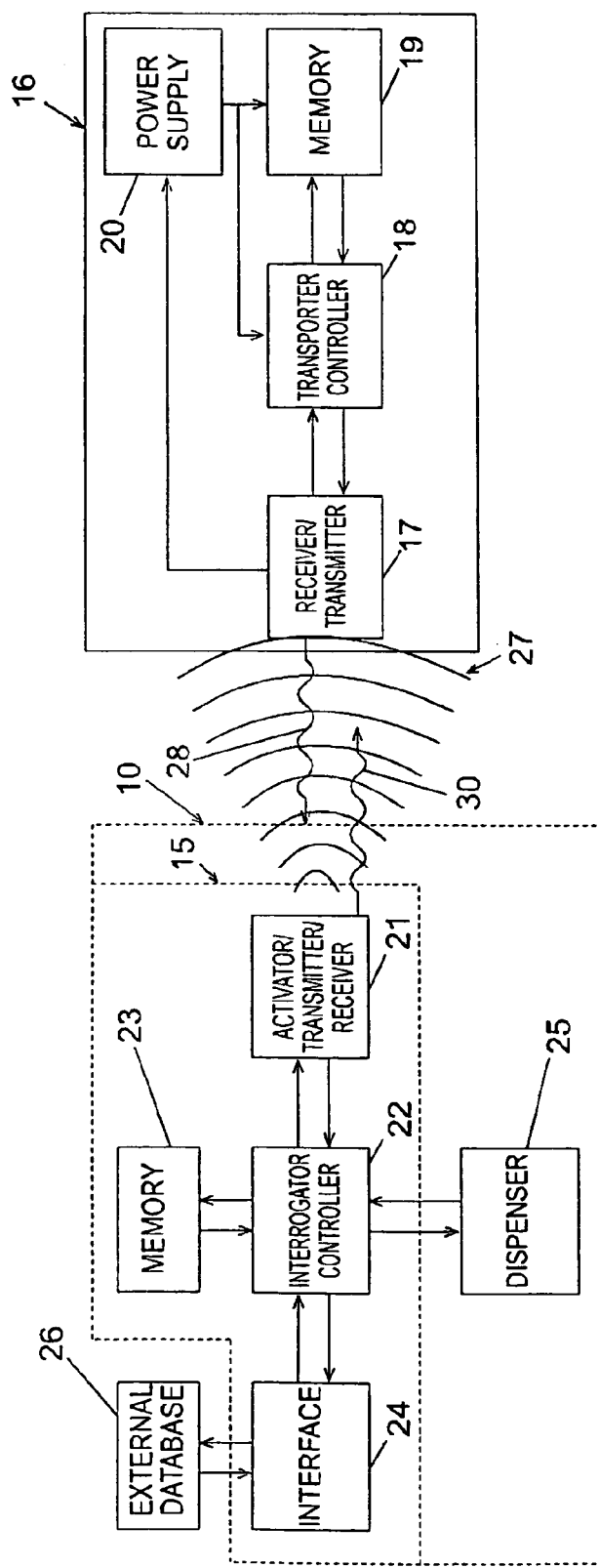
FIG. 4 is a block diagram illustrating signaling between the transponder and transponder interrogator of FIGS. 2 and 3.

Now, with reference to FIG. 4, the operation of the interrogator—transponder system will be described. The activator/transmitter/receiver unit 21 includes a coil for producing an electromagnetic field 27 having a predetermined frequency. The electromagnetic field 27 emanates some predetermined distance away from the front panel 12 of the vending machine 10 depending upon the power supplied to the activator/transmitter/receiver unit 21. For example, the electromagnetic field 27 might emanate six inches to five feet from the front panel 12. This electromagnetic field is normally provided by the activator/transmitter/receiver unit 21 in anticipation of a customer wishing to use the transponder 16 to make a purchase.

The receiver/transmitter unit 17 of the transponder 16 includes a coil for receiving the electromagnetic field 27, when the transponder is placed in the vicinity of the front panel 12 of the vending machine 10 by the customer C. The received electromagnetic field 27 is supplied to the power supply unit 20, which may be in the form of a capacitor. The power supply unit 20 powers the transponder controller unit 18 and the memory unit 19.

When the transponder controller unit 18 is initially powered, it executes a programming step whereby it automatically retrieves a code from the memory unit 19. The code is sent from the transponder controller unit 18 to the receiver/transmitter unit 17, whereupon the receiver/transmitter unit 17 responds by sending out this code via an electromagnetic signal 28.

The code stored in the memory unit 19 is a unique identifying code. In other words, a plurality of transponders would be distributed or sold to members of the public, wherein each transponder's memory unit 19 would have a pre-stored unique identifying code. An electrically erasable, programmable, read only memory (EEPROM) is particularly well suited for the memory unit 19. Also, it is important to note that the transponder 16 does not necessarily need a power supply unit 20. The receiver/transmitter unit 17, transponder controller unit 18 and memory unit 19 can be powered directly from the received electromagnetic field 27.

The electromagnetic signal 28 is received by the activator/transmitter/receiver unit 21 of the transponder interrogator 15. The received signal is then communicated to the interrogator controller unit 22. The interrogator controller unit 22 relays the identifying code to the interface unit 24. The interface unit 24 relays the identifying code to a central, external database 26. Communications between the interface unit 24 and the external database 26 may be accomplished via a hardwired connection, such as by using telephone lines. It is also envisioned that the communications could occur over a wireless medium, such as by cellular transmissions, microwave signals, or satellite communications. Preferably, an encryption scheme would be applied to the communications to protect privacy and to reduce the likelihood of fraud.

It is also envisioned that all or part of the communication would occur over the internet. The communication of the identifying code could be sent, via an e-mail, to the central, external database 26. The vending machine 10 could also include audio/video capture and display devices. If such devices are included, the email sent to the central, external database 26 could include an image or sound bite of the customer. Also, the signal returned from the central, external database 26 could include images and/or sounds for presentation to the customer.

The external database 26 has the ability to track the purchase times, prices, and locations for each transaction relative to each individual transponder 16. If the transponder 16 is registered to an individual customer C, then the transactions of the individual transponder 16 can be used to approximate the purchasing habits for that individual customer C.

Referring back to FIG. 4, the interrogator controller unit 22 must now decide whether the customer's transponder 16 is authorized to cause a vending operation. If so, the interrogator controller unit 22 will issued a vend signal to the dispenser 25 causing the dispenser 25 to vend a beverage. If not, the interrogator controller unit 22 will not issue a vend signal to the dispenser, but rather will issue a command to a display 29 (See FIG. 5) located on the front panel 12 of the vending machine 10, informing the customer C that the transponder 16 is not enabled to cause a vending operation.

Now, the manner by which the interrogator controller unit 22 decides whether a vending operation will be allowed will be described. In a first embodiment, the memory unit 19 of the transponder 16 stores a credit amount. The credit amount relates to the purchasing power of the transponder. For example, the transponder 16 could have ten dollars worth of credit. The credit amount could be initialed stored in the transponder 16 at the time the customer C takes possession of the transponder 16, or the credit amount could be subsequently added to the transponder 16 at a special credit purchasing machine or at the vending machine.

Figure 5:
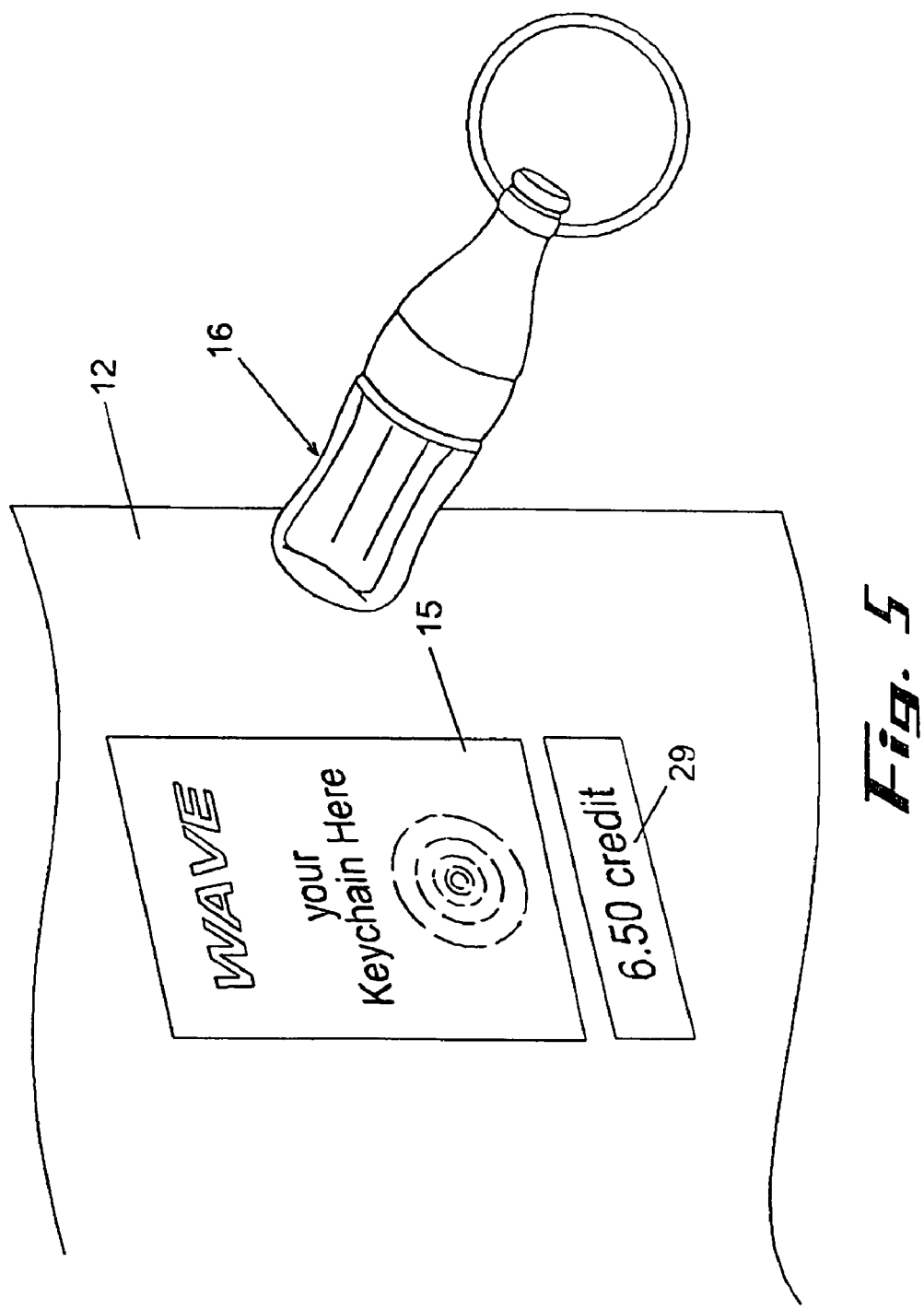
FIG. 5 is a close-up perspective view of the transponder, embedded in a promotional key chain, being waved in front of the transponder interrogator.

In the first embodiment, the electromagnetic signal 28, initially sent by the receiver/transmitter unit 17 includes not only the identifying code, but also this credit amount. The interrogator controller unit 22 evaluates the credit amount. If the credit amount is greater than the purchase price of the beverage selected by the customer C, the purchase is allowed. If not, the purchase is denied. Referring to FIG. 5, the display 29 is a particularly advantageous way of informing the customer C of the remaining credit amount stored within the transponder 16.

Once the interrogator controller unit 22 establishes that the credit amount exceeds the purchase price, the interrogator controller unit 22 transmits an electromagnetic signal 30. The electromagnetic signal 30 informs the transponder 16 of its new credit amount, which equals the old credit amount minus the purchase price. The new credit amount is received by the receiver/transmitter unit 17, processed by the transponder controller unit 18, and stored in the memory unit 19. Thus, the transponder 16 is a read/write type of transponder.

Once stored, the transponder controller unit 18 causes the receiver/transmitter unit 17 to transmit the unique identification code and the new credit amount. When the interrogator controller unit 22 verifies that the new credit amount is stored within the memory unit 19 of the transponder 16, the interrogator controller unit 22 causes a dispense signal to be sent to the dispenser 25.

Now, a second embodiment by which the interrogator controller unit 22 decides whether a vending operation will be allowed will be described. In the second embodiment, the external database 26 stores the credit amounts associated with the individual, uniquely identified, transponders 16. Therefore, the credit amount, which was stored in the memory unit 19, in the first embodiment, will now be stored in the external database 26, and the transponder 16 can be a read-only type of transponder.

The second embodiment has the following advantages. First, the memory unit 19 of the transponder 16 can be a read-only memory and can be smaller and less expensive. Second, when the transaction data is being sent to the external database 26, as described above, the external database 26 can respond with the credit amount associated with the identified transponder 16. Third, storing the credit amount in the external database eliminates the possibility of fraudulent purchases being made by using an unauthorized electronic device which replicates the transponder's credit signals. One drawback is that when the external database 26 is inaccessible, the purchase of the beverage using the transponder 16 will not be allowed, since the interrogator controller unit 22 will be unable to verify that a sufficient credit amount exists. All other aspects of the dispensing operation are similar to those describe in relation to the first embodiment.

In both the first and second embodiments, the external database 26 can be, or is, contacted and supplied with the unique identifying code for the transponder 16, respectively. One particular advantage of contacting the external database 26 is that data can be transmitted from the external database 26 to the interrogator controller unit 22. The interrogator controller unit 22 can evaluate this data and reward the customer with incentives.

For example, if the present purchase is the first time the customer C has used the transponder 16, the interrogator controller unit 22 can reward the customer with a free beverage, or a reduced price beverage (i.e. debit the stored credit amount some value less than the purchase price). As another example, the interrogator controller unit 22 can reward the customer C with a free beverage, or reduced price beverage, after a predetermined number of beverages have been purchased using a that particular transponder 16. It is also envisioned that a random number generator could be employed, whereby random transponder-using customers C are rewarded with free beverages.

Another advantage of the external database 26 is that each purchaser of a transponder 16 can be registered. During registration the purchaser of the transponder submits various information, such as their name, address, age, birth date, occupation, etc. Such information can be used to track the purchasing habits of particular population segments, and can prove useful for promotions and advertising purposes. As an incentive for filling out the registration information, the external database 26 might analyze the birth date, associated with the registered transponder owner, and if the birth date corresponds to the present date, the interrogator controller unit 22 would reward the customer C with a free beverage.

It is also envisioned that the memory unit 19, within the transponder 16, could store transaction data (e.g. track the number of times the transponder 16 has been used to make a purchase), and/or customer registration data (e.g. name, birth date). In this embodiment, the transponder 16 would transmit this data directly to the transponder interrogator 15 when a purchase is to be made. The transponder interrogator 15 would process the data, as described above, and reward the customer C with free beverages as appropriate. In this embodiment, the vending machine 10 would not need to be linked to the external database 26.

It is envisioned that the transponders 16 would be reusable and embedded in ornamental items or useful items, such as a key chain attachment, a fob, a watch, a ring, a necklace locket, other jewelry, a small flashlight, a pocket knife, or various other types of frequently carried items. These items would be sold to the public, or given to the public as a promotion.

A machine would be provided for supplementing a credit amount to the transponder 16, this making the transponder 16 reusable. The machine would include a money acceptance and verification section and would either establish communication with the transponder 16 in order to rewrite the credit amount stored within the memory unit 19, or contact the external database 26 and rewrite the credit amount stored therein.

It would also be possible to use the vending machine 10 to rewrite the credit amount stored within the memory unit 19 or stored within the external database 26. Under this approach, a customer C would insert money into the coin or bill acceptor 11 or insert a smart card into the smart card reader, present the transponder 16 to the transponder interrogator 15, and use selection buttons to instruct the vending machine 10 to credit the customer's transponder 16 a desired amount.

As an alternative to a reusable transponder 16, the transponders 16 could be disposable. In this alternative, transponders 16, having a pre-stored credit amount, would be sold to the public. When the credit amount of the transponder 16 was depleted through purchases, the transponder 16 would be discarded.

Now, with reference to FIG. 6, a broader aspect of the present invention, concerning the processing of consumer data, will be described. In the broader aspect of the present invention, the purchasing power of the transponder 16 is not required. In other words, the transponders 16 can include a credit amount associated therewith, as described in relation to FIGS. 1–5 above, or the transponders 16 may simply be used as an identification tool to uniquely identify the customer owning the transponder.

Figure 6:
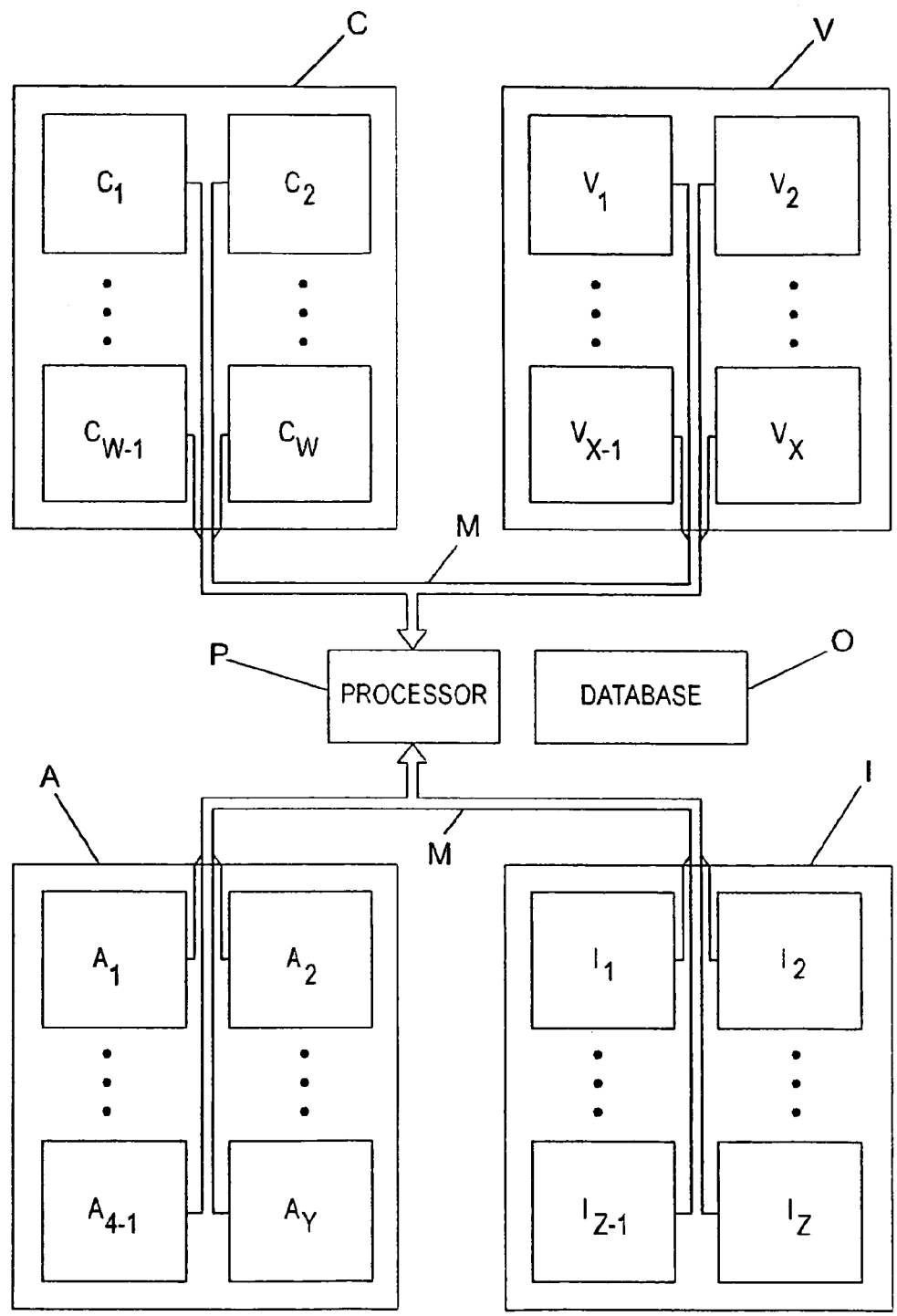
FIG. 6 is a block diagram illustrating a consumer purchasing-history monitoring system and consumer rewards system in accordance with the present invention.

In FIG. 6, transponder interrogators 15 are placed in terminals at various points of potential sale or interest. For example, the terminals could be placed at various cash registers $C_w$, vending machines $V_x$, automatic teller machines (ATMs) $A_y$, and points of customer interest $I_z$. The terminals could be contained in separate housings or integrated into existing structures associated with the various points of potential sale or interest. The points of potential sale or interest would be dispersed over a large network which could spread within a city, over a state, or entirely across the United States and/or foreign countries.

The cash registers CW would be typical cash registers, as located at grocery stores, convenience stores, department stores, gas stations, etc. The ATMs $A_y$ could be located at banks or at remote service areas, such as inside shopping malls, at amusement parks, etc. The vending machines $V_x$ could be beverage vending machines, as well as vending machines for dispensing other goods or services, such as candies, cigarettes, fare cards, stamps, sandwiches, gaming credits, video/pinball play credits, etc. The points of customer interest $I_z$ could be parks, fairs, concert pavilions, car sales lots, real estate agencies, travel agencies, etc.

Each terminal would be linked to an external processor P and database D, via a communication medium M. The communication medium M could be hardwired or wireless, such as via telephone lines, the internet, cellular channels, satellite channels, microwave channels, etc. Preferably, an encryption scheme would be applied to the communications occurring over the communication medium M to protect privacy and to reduce the likelihood of fraud.

The processor P would receive information from a terminal when a transponder 16 is presented to that terminal. The information would uniquely identify the transponder 16 and could also indicate transaction information. The transaction information could include the location of the terminal, the date and time the transponder 16 was presented, the amount of dollars spent, the goods or service purchased, etc.

The processor P would access a look-up table, in the database D, associating the uniquely identified transponder 16 to a person, presumably the registered owner of the transponder 16. As information is received from the various terminals, the processor P logs the information into the database D. This information could be useful in tracking a customer's purchasing habits, and could be used in market research, advertisements, and promotions.

A customer would have the opportunity to present their transponder 16 to any or all of the terminals. In order to entice the customer to present their transponder 16, a program would be established to reward customers based upon the purchases made at various points of potential sale or interest, and/or the mere act of presenting the transponder 16 at the various points of potential sale or interest.

One such program would be an instant rewards program. In the instant rewards program, customers could receive reduced prices on one or more of the products purchased. Also, as part of the instant rewards program, the processor P could communicate back to the terminals. If the customer's transaction met a predetermined condition, a reward would be given to the customer on the spot or at a later date. For example, if the customer purchases a case of beverages and two bags of chips, when using the transponder 16, the customer is given a free T-shirt or a hat. The predetermined condition could also be met on a random basis, regardless of the purchases made. For example, if a customer makes a purchase and presents the transponder 16, the customer could possibly win a vacation trip to Hawaii, a stereo, etc. The reward would be presented, or indicated, to the customer on the spot, or indicated to the customer at a later date, such as by mail.

Another such program would be a points reward program. In the points reward program, it is not necessary for the processor P to communicate back to the terminals. Points would be rewarded to the customers each time the transponder 16 is presented to a terminal. Points could be awarded for the simple act of presenting the transponder 16 to one of the terminals, and/or for the act of making a purchase at one of the terminals. The number of points could be based upon the location of the terminal, the product or service purchased or the amount spent. For example, five points could be awarded for the presentation of the transponder 16; one point could be awarded for each dollar spent; and ten points could be awarded for the purchase of a specified product. In addition, the points system could have certain bonus incentives. For example, purchases made at a certain location or at certain hours could earn double points; every tenth purchase could earn triple points; or bonus points could be awarded randomly.

Points could be redeemed for rewards in the form of money, goods, or services. In one embodiment, the rewards could be given automatically to the customer, at the point of potential sale or interest, once sufficient points are accumulated. In this embodiment, the processor P communicates back to the terminals to inform a store clerk to reward the customer on the spot, e.g. present the customer with a T-shirt, a coupon, or a gift certificate.

In another embodiment, the customer can select from various rewards for various attained point levels. Selection could occur at one of the terminals, by responding to a catalogue order form, or over the internet. For example, a customer could visit a web site, enter their transponder's serial number, enter a PIN number, access their accumulated points balance, and then select from various possible rewards.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the external database 26 may be provided within the vending machine 10. In this instance, the vending machine 10 would be a standalone system, and would not need to resort to the use of hardwired or wireless communication channels in order to access information concerning the transponder 16.

Please note, "Coca-Cola"™ and the Contour Bottle Shape used in the drawings are registered trademarks of The Coca-Cola Company.

What is claimed is:

1. A vending machine for storing and dispensing a good or service, comprising:
   a dispenser housing;
   a dispenser disposed within said dispenser housing for dispensing said good or service;
   a transponder interrogator disposed within said dispenser housing for communicating with a transponder unit; and
   a controller connected to said transponder interrogator and to said dispenser;
     said controller being able to cause said dispenser to dispense said good or service in response to data received from said transponder interrogator.

2. The vending machine according to claim 1, further comprising:
   a memory having pre-stored data connected to said controller, wherein said controller uses the data received from said transponder interrogator to access said pre-stored data and causes said dispenser to dispense said good or service when the accessed data meets a predetermined condition.

3. The vending machine according to claim 2, wherein said memory is located outside said dispenser housing.

4. The vending machine according to claim 2, wherein said memory is located within said dispenser housing.

* * * * *